Patented Mar. 5, 1929.

1,704,249

UNITED STATES PATENT OFFICE.

WILHELM HIRSCHKIND, OF ANTIOCH, CALIFORNIA, ASSIGNOR TO GREAT WESTERN ELECTRO CHEMICAL CO., OF SAN FRANCISCO, CALIFORNIA, A CORPORATION OF CALIFORNIA.

PROCESS FOR MAKING ALKALI-METAL XANTHATES.

No Drawing.     Application filed July 7, 1926. Serial No. 121,061.

This invention relates to the production of xanthates of the alkali metals and has for its object a simplification of manufacture and the direct production of a product of high concentration without separation of other matter.

Processes for the manufacture of alkali metal xanthates have as their basis the bringing into reaction of caustic alkali, alcohol and carbon bisulphide. Because of the very considerable heat generated by the reaction, it has heretofore only been possible to carry out the reaction in either an aqueous solution or an alcoholic solution or an inert liquor.

The object of this present invention is to directly combine the three constituents of the xanthate in only their equivalent amounts without any diluting or dissolving medium of any kind. The advantage thereby gained is that the reaction proceeds very rapidly and completely since the constituents are reacting in a state of their maximum concentration. Nearly quantitative yields and freedom from side reactions such as result in the formation of thiocarbonate, are obtained.

In order to bring about the above mentioned results, the caustic alkali used has to be in a finer state of division than is had by grinding or employed in the ordinary procedure for making alcohol-caustic mixtures. It requires that the alkali-alcohol mixture and compound be in nearly colloidal state, which I accomplish in the following manner:

It is known that by mixing caustic alkali more or less finely ground with alcohol, a partial formation of alkali alcoholate takes place and a considerable evolution of heat ensues. The resulting product is crystalline alcoholate and crystalline caustic alkali mixed together with a certain amount of water formed in the reaction.

I have discovered that by mixing caustic alkali, which may be flaked or ground to moderate size, with the combining equivalent amount of alcohol cooled to keep the temperature of the mass below 25° C., a colloidal-like mass is obtained which may be alcoholate or a mixture of caustic alkali and alcohol with alcoholate. This mixture which would ordinarily revert to crystalline condition may be held in the colloidal state by maintaining a low cooling temperature.

I have further discovered that such a colloidal-like alcoholate or alcohol caustic alkali mixture can be made to react with the amount of carbon bisulphide necessary to form alkali metal xanthate according to the equation:

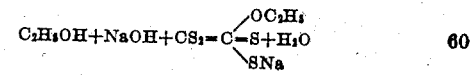

without any diluting whatsoever, provided it is carried out in an apparatus providing thorough agitation and cooling. The final reaction mass is an almost dry powder containing over 80% alkali metal xanthate. This material may be used as such or may be dried by well known methods to bring the xanthate content up to nearly 100%.

The following example will illustrate the process more in detail:

A jacketed iron kettle equipped with agitator is charged with 15 gallons of 95% grain alcohol, to which, after cooling by means of water or refrigerated brine circulated through the jacket, is added gradually 83 pounds of flaked caustic soda, 98% NaOH. The temperature of this mass is maintained around 20° C. at all times, (from 0 to 25° being the extreme limits). In a very short time all flakes or solid particles have disappeared and a colloidal mixture results. 156 pounds of carbon bisulphide are now run into the kettle slowly under continued agitation and cooling so that the temperature does not exceed 30° C. (from 0 to 35 being the extreme limits). Towards the end of the reaction the mass becomes stiff and is finally discharged as 340 pounds of a solid containing 85% sodium xanthate, and which may be submitted to a drying operation to produce a material between 90 and 100%.

Potassium xanthate may be produced by a similar operation using the substitute alkali.

I claim:

1. The process of making alkali-metal xanthate from alcohol, caustic alkali and carbon bisulfide which comprises combining these constituents only thereof under a temperature below 35° C. and introducing the carbon bisulfide last.

2. The process of making alkali-metal xanthate from alcohol, caustic alkali and carbon bisulfide which comprises combining these constituents thereof without other chemically active or inactive agencies under a temperature below 35° C. and introducing the carbon bisulfide last.

3. The process of making alkali metal xanthate which comprises bringing together of a caustic alkali and alcohol only while maintaining the temperature at about 20° C., and then introducing carbon bisulphide while maintaining the temperature not to exceed about 30° C., all while agitating the ingredients.

4. In the process of making alkali metal xanthate, the step of forming an alcoholate by combination of alcohol and an alkali only and maintaining the same in colloidal like condition by the application thereto of a temperature below 35° C. during and after formation.

5. The process of making alkali metal xanthate which comprises combining alcohol and finely reduced caustic alkali only under agitation at a temperature of about 20° C. and of adding carbon bisulphide with continued agitation while maintaining the temperature below 25° C., the constituents being used substantially in their combining proportions.

6. The process of making alkali metal xanthate which comprises bringing together of caustic alkali and alcohol in proportions to form an alcoholate while maintaining the ingredients at a temperature not exceeding 25° C. whereby a colloidal-like mass results, and of combining with said colloidal-like mass the equivalent amount of carbon bisulphide while maintaining the mass at a temperature not exceeding 35° C.

WILHELM HIRSCHKIND.